United States Patent [19]
Semchuck et al.

[11] Patent Number: 5,865,473
[45] Date of Patent: Feb. 2, 1999

[54] ISOLATED CONDUIT SYSTEM

[75] Inventors: Mario E. Semchuck, Scottsdale, Ariz.; Curtis S. Woolley, Carlsbad; Joe D. Rodriquez, Alta Loma, both of Calif.

[73] Assignee: Emhart Inc., Newark, Del.

[21] Appl. No.: 785,118

[22] Filed: Jan. 21, 1997

[51] Int. Cl.⁶ .................................. F16L 9/14; B67D 5/37
[52] U.S. Cl. ............................ 285/55; 285/342; 137/801; 137/606
[58] Field of Search ................................ 285/54, 55, 116, 285/342, 343; 137/375, 606, 801; 138/143, 146

[56] References Cited

U.S. PATENT DOCUMENTS

| | | |
|---|---|---|
| 352,964 | 11/1886 | Walsh . |
| 383,780 | 5/1888 | Timberlake . |
| 1,609,159 | 11/1926 | Dawson . |
| 2,257,385 | 9/1941 | Keegan . |
| 2,794,658 | 6/1957 | Purkhiser . |
| 3,148,896 | 9/1964 | Chu . |
| 3,338,598 | 8/1967 | Kurtz . |
| 3,747,960 | 7/1973 | Bawa . |
| 3,828,823 | 8/1974 | Douglas . |
| 4,570,983 | 2/1986 | Olenfalk et al. . |
| 4,801,158 | 1/1989 | Gomi . |
| 4,991,876 | 2/1991 | Mulvey . |
| 5,088,773 | 2/1992 | Gralenski . |
| 5,137,202 | 8/1992 | Purdy, III . |
| 5,143,407 | 9/1992 | Cokeh . |
| 5,169,180 | 12/1992 | Villoni et al. . |
| 5,308,122 | 5/1994 | Crawford et al. . |
| 5,579,808 | 12/1996 | Mikol et al. ............................. 137/801 |
| 5,669,417 | 9/1997 | Lian-Jie .................................. 137/801 |

*Primary Examiner*—Anthony Knight
*Assistant Examiner*—Gary Grafel
*Attorney, Agent, or Firm*—J. Bruce Hoofnagle

[57] ABSTRACT

In a water flow system, a non-metallic liner 50 is placed within at least a portion of a passage 48 of a supporting metallic end body 38 to preclude contact between any water flowing through the system and the passage of the end body. The liner 50 includes a flared section 60 at a first end 54 thereof which engages a bevelled surface 49 of the end body 38 and is held there in sealing fashion by a cone washer 82 and a nut 84 threadedly coupled to the end body. At a location near a second end 56 of the liner 50, the liner is formed with a first stepped shoulder 62 which facilitates location of the liner within the passage 48 of the end body 38 at the second end of the liner. A second stepped shoulder 64 is formed on the liner 50 which provides a location for an O-ring 72 which engages an adjacent portion of the passage 48 of the end body to form a seal thereby. With seals formed at the first and second ends 54 and 56 of the liner 50, any water passing through the liner will not contact the passage 48 of the end body 38.

19 Claims, 5 Drawing Sheets

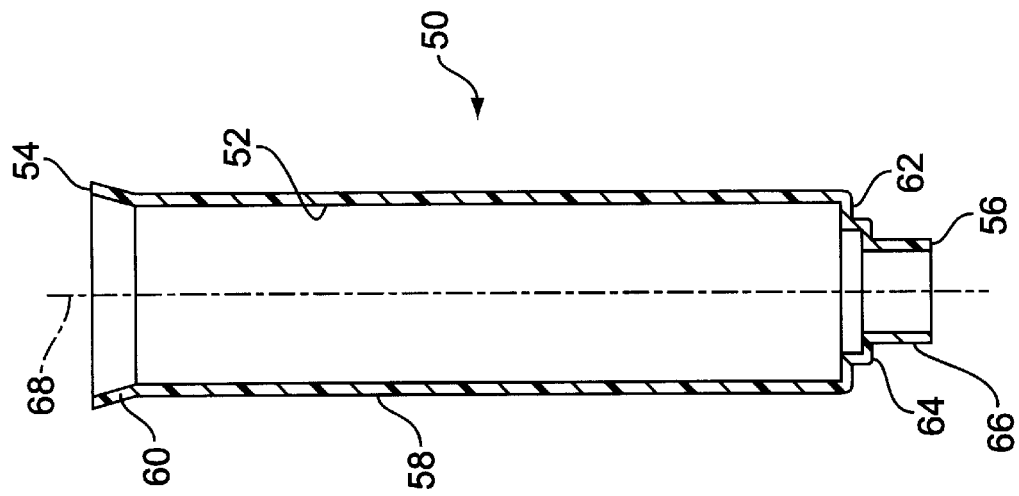
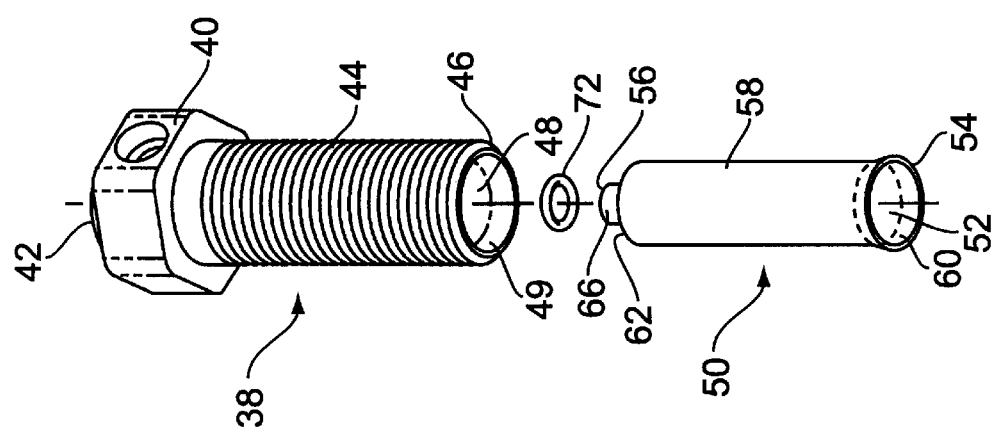
FIG. 3
FIG. 2

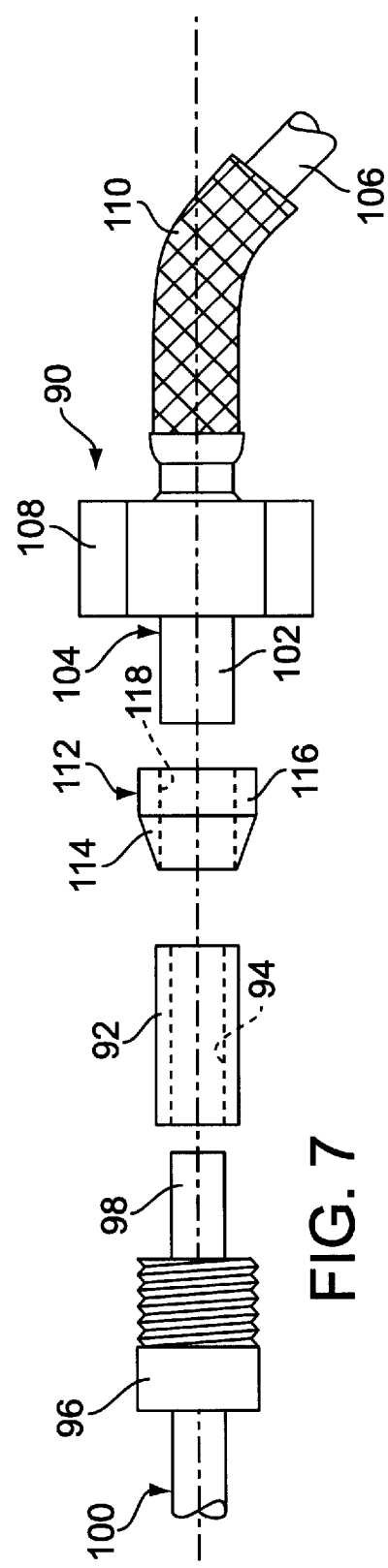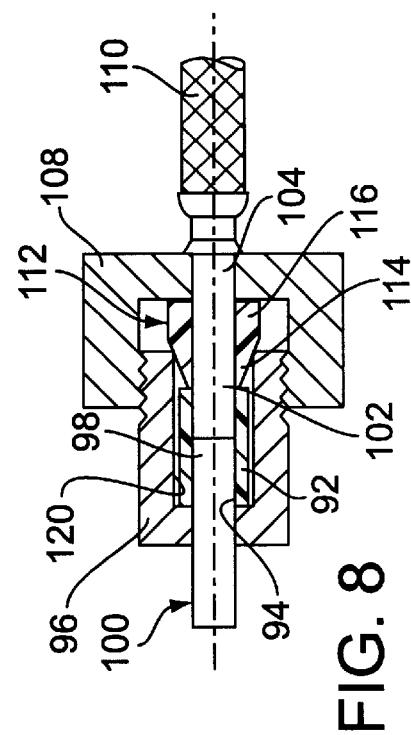

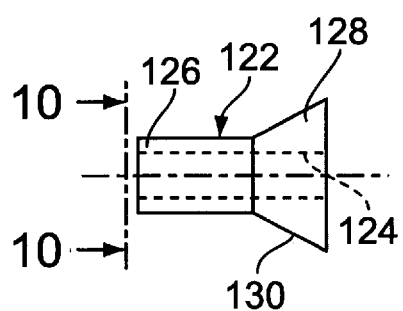 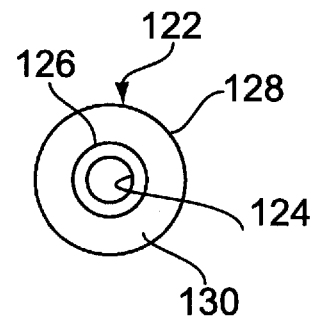
FIG. 9  FIG. 10
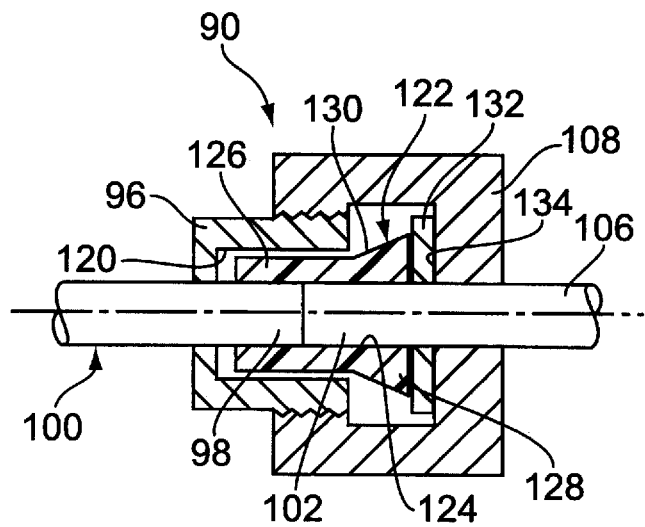
FIG. 11

ISOLATED CONDUIT SYSTEM

BACKGROUND OF THE INVENTION

This invention relates to an isolated conduit system, and particularly relates to a conduit system where fluid flowing through the system is isolated from contact with selected components of the system.

In some plumbing systems used today, fluid-conducting portions of these systems are composed of metals which are known to leach metallic elements into a fluid, such as water, passing therethrough and in contact therewith. The fluid-conducting portions include couplers for coupling the butt ends of two adjoined conduits, inlet mounts of a faucet system such as, for example, a hollow end body, and the like. Typically, the couplers, the end bodies and other metal components are composed of a rigid metal material such as brass to provide a non-corroding, sturdy, easily machinable component.

In recent years, there has been an effort to provide plumbing systems which use materials other than the durable metal material such as brass. However, as noted above, the brass components are highly durable, provide strength and support to the associated assembly, are somewhat resistant to corrosion from water and are conducive to machining when forming the couplers, end bodies and the like into the desired configurations.

In order to continue the use of such metal components, including brass components, in fluid-flow systems, a need has evolved to provide some form of isolation between, at least, a major portion of the liquid flow passages of the metal components and the fluid flowing therethrough to significantly reduce the amount of metallic elements which may leach into the water.

SUMMARY OF THE INVENTION

It is, therefore, a object of this invention to provide an isolated conduit system which precludes contact between a conduit of the system and fluid flowing therethrough.

Another object of this invention is to provide an isolated conduit system which includes structure for conducting the flow of fluid therethrough while isolating the fluid from a component which supports the structure.

A further object of this invention is to provide an isolated conduit system which is economical to manufacture and assemble.

With these and other objects in mind, this invention contemplates an isolated conduit system which includes a rigid metallic support having a passage with an interior wall formed therethrough. The passage is formed with a first end opening and a second end opening spaced therefrom, the spacing of which defines a prescribed distance of the length of the passage. A liner, composed of a non-metallic material, is formed therethrough with a passage having an interior wall and a first end opening and a second end opening spaced therefrom. The liner is located within the passage of the metallic support with the first end openings of the support and the liner being juxtaposed and the second end openings of the support and the liner being juxtaposed. The liner is of sufficient length and shape, to isolate the interior wall of the metallic support from the interior wall of the liner. Means are provided adjacent the juxtaposed first end openings and the juxtaposed second end openings for isolating the interior walls of the support openings from the interior walls of the liner openings.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2 is an exploded view of the end body and the liner of FIG. 1 in accordance with certain principles of the invention;

FIG. 3 is a sectional view of the liner of FIG. 1 in accordance with certain principles of the invention;

FIG. 6 is a perspective view of a fourth embodiment of a liner for forming a portion of a second embodiment of an isolated conduit in accordance with certain principles of the invention;

FIG. 7 is an exploded view of the second embodiment of the isolated conduit in accordance with certain principles of the invention;

FIG. 8 is a sectional view of the assembly of the isolated conduit of FIG. 7 in accordance with certain principles of the invention;

FIG. 9 is a side view of a fifth embodiment of a liner for forming a portion of a third embodiment of an isolated conduit in accordance with certain principles of the invention;

FIG. 10 is a view taken along line 10—10 of FIG. 9 showing an end view of the liner of FIG. 9; and FIG. 11 is sectional view of the assembly of the third embodiment of the isolated conduit in accordance with certain principles of the invention.

DETAILED DESCRIPTION OF THE PREFERRED EMBODIMENTS

Figure 1:
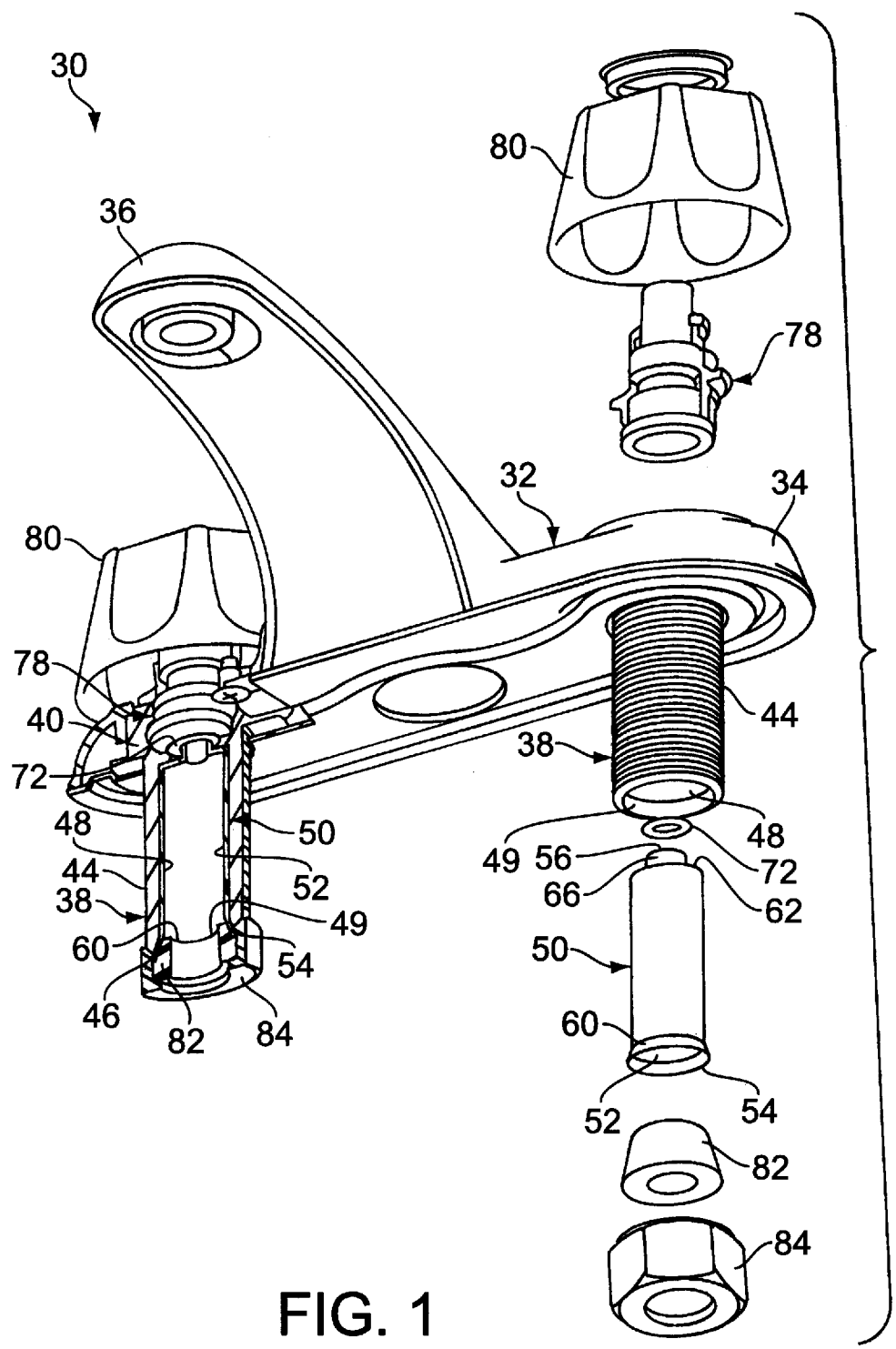
FIG. 1 is a partially exploded, partially sectional view showing a faucet including a pair of end bodies and a first embodiment of a liner to form a first embodiment of isolated conduits in accordance with certain principles of the invention.

Referring to FIG. 1, a faucet 30 includes a housing 32 formed with a base 34 and a spout 36. The faucet 30 is a two-handle faucet and includes two identical series of components, a first of which is shown to the right of the spout 36 in an exploded arrangement, and a second of which is shown to the left of the spout in an assembled arrangement. Since the two series of components are essentially identical, the same numerals will be assigned below to common components of the two arrangements.

The faucet 30 further includes a first embodiment of an isolated conduit system comprising a pair of end bodies 38, a pair of non-metallic liners 50, a pair of O-rings 72, a pair of resilient cone-shaped washers 82 and a pair of nuts 84. Also included in the faucet 30 are a pair of valves 78 and a pair of handles 80. The cone washers 82 could be composed of any suitable resilient material such as, for example, rubber.

Figure 4:
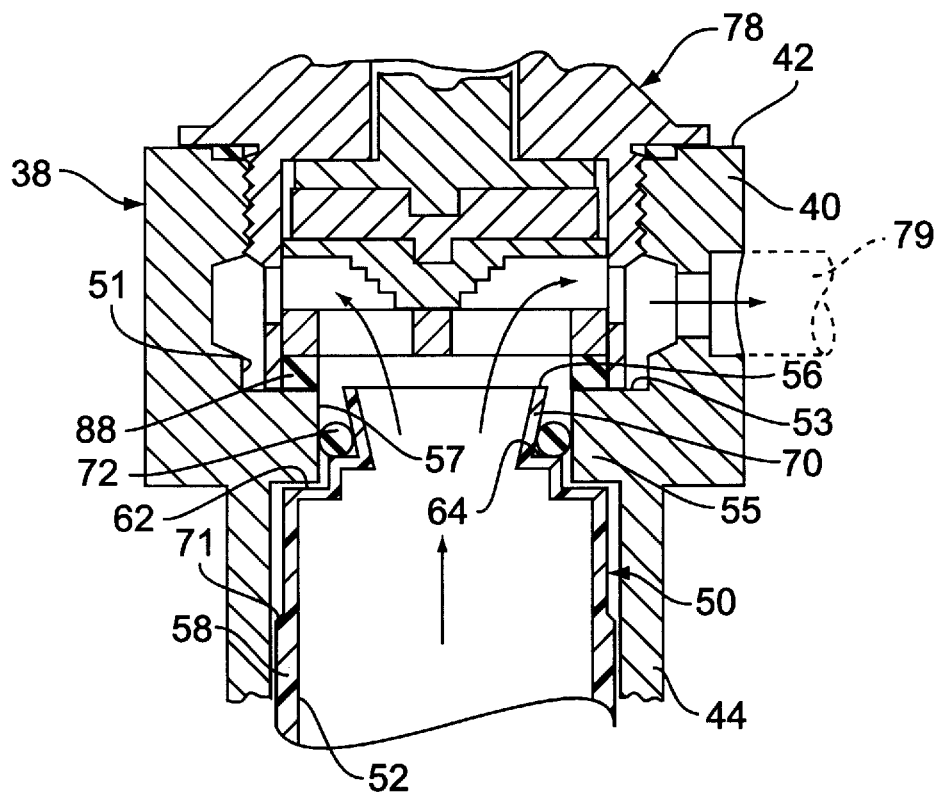
FIG. 4 is a sectional view of a portion of the end body and a second embodiment of the liner of FIG. 1 in assembly with a valve of the faucet of FIG. 1 in accordance with certain principles of the invention.

As shown in FIG. 2, the end body 38, which is composed of a rigid metal material such as, for example, brass, is formed with a head 40 near a first end 42 thereof and an externally threaded sleeve 44 extending to a second end 46 thereof opposite the first end. The end body 38 is formed with a cylindrical opening or passage 48 which extends through the head 40 and sleeve 46 between and through the first end 42 and the second end 46 thereof. The opening 48 is formed with a bevelled or outward flared surface 49 contiguous with the second end 46 of the end body 38. As shown in FIG. 4, a cylindrical opening 51 is formed in the first end 42 of the end body 38 and includes a base floor 53 having an inward extension 55 with a central opening 57 therethrough.

Referring to FIGS. 2 and 3, a first embodiment of the non-metallic liner 50 is formed with an opening or passage 52 which extends between and through a first end 56 and a second end 54 spaced from the first end. The liner 50 is formed with a central cylindrical section 58 of a prescribed first diameter and a flared section 60 which flares outward from the central section at the first end 56 of the liner. At the opposite of end of the center section 58 near the second end 54 of the liner 50, the liner is formed with a first stepped shoulder 62 and a second stepped shoulder 64 which joins with a cylindrical end section 66 formed at a second prescribed diameter which is less than the first prescribed diameter. The first stepped shoulder 62 extends inward toward an axis 68 of the liner 50 from the adjacent end of the central section 58 to which it is joined. The second stepped shoulder 64 is spaced axially from the first shoulder 62 toward the second end 54 of the liner 50 and is also formed inward toward the axis 68 and is closer to the axis than the first shoulder. The O-ring 72 is positioned around the end section 66 and rests on the stepped shoulder 64 in this embodiment.

As shown in FIG. 4, a second and preferred embodiment of the liner 50 is formed with the stepped shoulders 62 and 64. However, the portion of the liner 50 which extends from the axially outermost shoulder 64 to the first end 56 of the liner is flared outward in an axial direction toward the second end to form a funnel-shaped section 70. The O-ring 72 is located on the stepped shoulder 64 and is in engagement with the exterior wall of the section 70. The exterior wall of the central section 58 of the liner 50 is formed with a bevel surface 71 which extends around the section.

Figure 5:
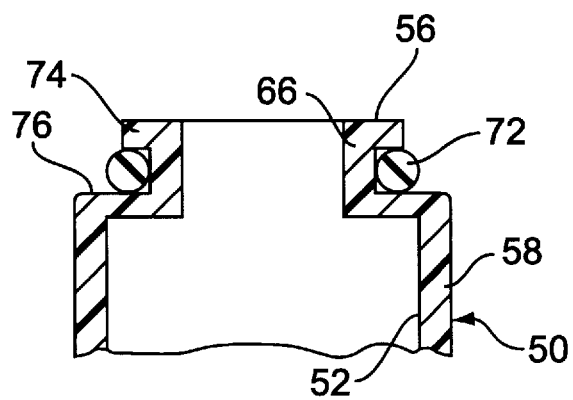
FIG. 5 is a sectional view of a third embodiment of the liner of FIG. 1 in accordance with certain principles of the invention.

As shown in FIG. 5, another embodiment of the liner 50 includes a flange 74 which extends laterally from the cylindrical end section 66 at the first end 56 of the liner. The O-ring 72 is located around the end section 66 and between the underside of the flange 74 and a stepped shoulder 76 formed at an adjacent end of the central section 58 of the liner 50.

The various embodiments of the liner 50 as shown in FIGS. 3, 4 and 5, can be composed of any non-metallic material such as, for example, a suitable plastic material which can retain, in a stand-alone fashion, any of the configurations illustrated in FIGS. 3, 4 and 5. The preferred material for the liner 50 is polypropylene.

Referring again to FIG. 1, in the past, water being supplied to the faucet 30 would flow into the bottom of the brass end bodies 38 at the second end 46 thereof, through the end bodies, through the two selectively operable valves 78, through conduits 79 (one shown in FIG. 4) to a center body (not shown), through a conduit (not shown) in the spout 36 and from the spout. During the flow of water through the end bodies 38, and during periods when the water is standing in the end bodies, the water would come into contact with the walls of the openings 48 of the end bodies 38. This could result in minimal leaching of metals from the brass into the water flowing through, or standing in the end bodies 38. The other components of the water flow system, including the conduits 79, the valves 78, the center body and the conduit in the spout 36, are composed of materials other than brass, and are not of concern. Thus, only the brass end bodies 38 of the faucet 30 posed any potential concern.

To greatly reduce the opportunity for metal leaching from the brass end bodies 38 when the water is flowing through the end bodies, or is standing in the end bodies, the liner 50 was developed to isolate a major portion of the end bodies from contact with the water as described below.

When assembling the components of the faucet 30, the end bodies 38 are attached to the base 34 of the housing 32 in the position shown to the left of the spout 36 in FIG. 1. Assuming that the preferred embodiment of the liner 50, which includes the funnel-shaped section 70 (FIG. 4), is to be assembled with each end body 38, the O-ring 72 is first placed over the section 70 and rests on stepped shoulder 64. The liner 50 is then inserted into the opening 48 of the end body 38 with the first end 56 of the liner first entering the opening 48 at the second end 46 of the end body. The liner 50 is moved further into the opening 48 of the end body 38 until the stepped shoulder 62 of the liner engages the underside of the extension 55, as shown in FIG. 4, to preclude further movement of the liner into the opening 48. In this position, the first end 56 of the liner is flush with the base floor 53 of the end body 38, and the section 70 of the liner 50 and the O-ring 72 are located within, and adjacent the wall of, the opening 57 of the end body. The O-ring 72 is urged between the flared section 70, the opening 57 and the shoulder 64 to form a water-tight seal. Also, the flared section 60 of the liner 50 is in engagement with the bevelled surface 49 of the end body 38 at the end 46 thereof.

The cone washer 82 is then inserted into the opening 52 of the liner 50 at the second end 54 thereof where the tapered surface of the cone washer engages the interior surface of the flared section 60 of the liner. The nut 84 is then threadedly mounted on the end body 38 at the second end 46 thereof to firmly press the cone washer 82 against the flared section 60 of the liner 50 which, in turn, is pressed firmly against the bevelled surface 49 of the end body to thereby seal the assembly of the lower end of the liner with the lower end of the end body. This use of the cone washer 82 and nut 84 also insures that the shoulder 62 of the liner 50 is firmly, but not sealingly, against the underside of the extension 55 of the end body 38 to insure the proper locating of the liner within the end body.

Referring to FIGS. 1 and 4, each of the valves 78 are now inserted into the opening 51 of the respective end body 38 to locate an underside surface 86 (FIG. 4) of the valve on the base floor 53 of the end body. As the valve 78 is moved into this position, a resilient sealing ring 88 (FIG. 4) of the valve is placed in engagement with the base floor 53, a short distance from the O-ring 72, to provide a water-tight seal with respect to the adjacent portion of the end body 38. The O-ring 72 effectively forms a water-tight seal between the end body 38 and the liner 50 at the end 56 of the liner. In this manner, water flowing through the opening 48 of the metallic end body 38 will pass through the non-metallic liner 50, or, if not flowing, will stand in the non-metallic liner, and will be isolated and prevented from engaging a significant portion of the end body thereby precluding the leaching of metals from that portion of the end body into the water.

It is noted that if one wished to further isolate the water from contact with the end body 38, such as the exposed area of the end body shown in FIG. 4 between the O-ring 72 and the sealing ring 88, the ring could be formed with a radially-inward extension to cover the end 56 of the liner 50. Or, a wedge-shaped seal could be used in place of the O-ring 72 which would conform to the configuration of the space formed by the wall of the opening 57, the shoulder 64 and the exterior wall of the section 70. The wedge-shaped seal would extend above end 56 of the liner 50 to engage the sealing ring 88 as well as isolate the opening 53 from any water flowing through the faucet 30.

Other designs could be used to further isolate the end body 38 from the water flowing through the faucet 30. For example, the embodiment of the liner 50 shown in FIG. 5 could be formed with the flange 74 extending radially outward to a diameter slightly less than the diameter of the opening 57. The sealing ring 88 would then be formed with a radially-inward extension which would not only seat on the base floor 53 but would also seat on the top surface of the flange 74 to thereby facilitate complete isolation of the water from the end body 38.

Referring to FIG. 7 and 8, a second embodiment of an isolated conduit system is formed by a coupler 90 which includes a fourth embodiment of a liner 92 (FIG. 6) formed of a non-metallic material such as, for example, an elastomer in the shape of a cylindrical sleeve with an opening 94 formed therethrough. The preferred material of the liner 92 is rubber.

As shown in FIGS. 7 and 8, the coupler 90 includes a brass fitting 96 which is placed onto an end 98 of a copper tube 100 which is to be butt-coupled with an end 102 of another tube 104 which could be composed of copper or a material which is bendable about its axis. The tube 104 is an extension of a conduit 106 which may be integrally formed therewith, or may be a separate element extending therefrom. A coupling nut 108 is located about a trailing portion of the tube 104 and is rotatable with respect thereto. The conduit 106 is covered with a flexible and protective sheath 110 which is attached to the nut 108 in such a manner that the nut is rotatable with respect to the sheath. A resilient cone washer 112 also forms a portion of the coupler 90 and is formed with an externally tapered section 114 and a cylindrical section 116 with an opening 118 therethrough. The cone washer 112 can be composed of any suitable resilient material such as, for example, rubber.

After the fitting 96 has been placed onto the tube 100, the end 98 of the tube 100 is placed into the opening 94 at one end of the liner 92 with the end being located intermediate the opposite ends of the liner as shown in FIG. 8. The cone washer 112 is then placed on the end 102 of the tube 104 and moved toward the nut 108 such that the end 102 extends through and from the opposite end of the washer and is thereby exposed. The exposed end 102 of the tube 104 is inserted into the opening 94 at the other end of the liner 92 such that the ends 98 and 102 are in butting engagement. The fitting 96 and the coupling nut 108 are moved axially toward each other and, by virtue of threads formed on each, are threadedly coupled as shown in FIG. 8. As the fitting 96 and the nut 108 are drawn together, the liner 92 and the buttengaged ends 98 and 102 of the tubes 100 and 104, respectively, are moved into an axial opening 120 of the fitting. Eventually, the tapered section 114 of the cone washer 112 moves into the opening 120 to compress the liner 92 within the opening 120 as well as to seal the opening 120 at the normally open end thereof.

In the configuration as shown in FIG. 8, the liner 92 isolates any water flowing through, or standing in the tubes 100 and 104, and the butt joint established at the ends 98 and 102, respectively, from any contact with the brass fitting 96, thereby precluding the leaching of metals of the brass fitting into the water.

Referring now to FIGS. 9, 10 and 11, a fifth embodiment of a liner 122, which is used with the second embodiment of the isolated coupling system 90, is formed with an opening 124 therethrough, a cylindrical forward section 126 and a rear section 128 having a tapered exterior surface 130. The liner 122 could be composed of any suitable resilient material such as, for example, rubber. The second embodiment of the coupling system 90 also includes a hard washer 132. When assembling the elements of the coupling system 90, the fitting 96 is placed onto the tube 100 and moved inboard of the end 98 of the tube. The coupling nut 108 and the washer 132 are placed onto the tube 106 as shown in FIG. 11 and moved axially inward along the tube. The open end of the opening 124 which is adjacent the cylindrical section 126 of the liner 122 is placed onto the end 98 of the tube 100 and moved over the tube until the end 98 is located in an intermediate portion of the opening 124 of the liner 122. The end 102 of the tube 106 is then moved into the end of the opening 124 of the liner 122 adjacent to the rear section 128 thereof until the end 102 is in butt engagement with the end 98 of the tube 100.

The brass fitting 96 and the coupling nut 108 are moved into position for threadedly coupling the fitting and the nut together with the washer 132 being captured between the outboard end of the tapered section 128 and an inner base surface 134 of the nut. As the nut 108 is threadedly tightened onto the fitting 96, the resilient liner 122 is compressed into the opening 120 of the fitting to isolate water flowing through the tubes 100 and 106, and the butt joint thereof, from contact with any portion of the brass fitting. Further, the tapered section 128 partially enters the opening 120 of the fitting 96 to enhance the isolation. With this configuration, there is no leaching of metals from the brass fitting 96 into the water flowing through the tubes 100 and 106.

The above-described embodiments of a liner and a coupling system all function to preclude the isolation of a fluid flowing through the system from contact with selected portions of metallic components surrounding the flow path of the fluid to thereby preclude the leaching of metals from the metallic components into the fluid flowing through the system.

In general, the above-identified embodiments are not to be construed as limiting the breadth of the present invention. Modifications, and other alternative constructions, will be apparent which are within the spirit and scope of the invention as defined in the appended claims.

What is claimed is:

1. An isolated conduit system, which comprises:

a rigid metallic support having a passage with an interior wall formed therethrough;

the passage of the support formed with a first end opening and a second end opening spaced therefrom, the spacing of which defines a prescribed distance of the length of the passage;

a liner, composed of a non-metallic material, is formed with a passage through the liner and has an interior wall and a first end opening and a second end opening spaced from the first end opening;

the liner being formed with a generally cylindrical intermediate section, a first end section, and an integrallyjoined outwardly flared second end section spaced from the first end section;

the liner being located within the passage of the metallic support with the first end openings of the support and the liner being juxtaposed and the second end openings of the support and the liner being juxtaposed;

the liner being of sufficient length and shape, to isolate the interior wall of the metallic support from the interior wall of the liner; and means provided adjacent the juxtaposed first end openings and the juxtaposed second end openings for isolating adjacent portions of the interior walls of the support passage from adjacent portions of the interior walls of the liner passage.

2. The isolating system as set forth in claim 1, wherein the interior wall of the passage of the support is formed to receive the liner which isolates fluid flowing through or standing in the passage of the liner from contacting the interior wall of the passage of the support.

3. The isolating system as set forth in claim 1, wherein the first end opening of the support is formed in a shape complimentary to, and for receipt of, the first end section of the liner.

4. The isolating system as set forth in claim 3, which further comprises a seal located between the first end opening of the support and the first end section of the liner.

5. The isolating system as set forth in claim 3, wherein the second end opening of the support, and the second end section of the liner are each formed in a shape for facilitating engagement with each other upon locating the liner within the passage of the support.

6. The isolating system as set forth in claim 5, which further comprises means for urging the second end section of the liner into sealing engagement with the second end opening of the support.

7. The isolating system as set forth in claim 6, which further comprises a seal located between the first end opening of the support and the first end section of the liner.

8. The isolating system as set forth in claim 1, wherein the liner is formed with a stepped section between the intermediate section and the first end section.

9. The isolating system as set forth in claim 1, wherein the first end section is generally cylindrical.

10. The isolating system as set forth in claim 1, wherein the first end section is flared outward in an axial direction away from the intermediate section.

11. The isolating system as set forth in claim 1, wherein the first end section extends to a free end thereof and a flange is formed at the free end and extends laterally away from an axis of the first end section.

12. The isolating system as set forth in claim 8, wherein the liner has a central axis and the stepped section comprises:

a first shoulder adjacent and extending laterally from one end of the intermediate section toward the central axis, and a second shoulder spaced axially from the first shoulder in a direction away from the intermediate section and extending laterally closer toward the central axis than the first shoulder.

13. An isolating conduit system, which comprises:

a rigid metallic support having a passage with an interior wall formed therethrough;

the passage of the support formed with a first end opening and a second end opening spaced therefrom, the spacing of which defines a prescribed distance of the length of the passage;

a liner, composed of a non-metallic material, is formed therethrough with a passage having an interior wall and a first end opening and a second end opening spaced therefrom;

the liner being located within the passage of the metallic support with the first end openings of the support and the liner being juxtaposed and the second end openings of the support and the liner being juxtaposed;

the liner being of sufficient length and shape, to isolate the interior wall of the metallic support from the interior wall of the liner;

means provided adjacent the juxtaposed first end openings and the juxtaposed second end openings for isolating adjacent portions of the interior walls of the support passage from adjacent portions of the interior walls of the liner passage; and the liner is located for positioning over a butt joint of two adjoined conduits which conduct fluid therethrough, and the support surrounds the liner.

14. The isolating system as set forth in claim 13, which further comprises a fastening element for coupling to the support with the liner captured and compressed therebetween.

15. The isolating system as set forth in claim 14, which further comprises a compliant element between the fastening element and the liner to enhance the compression of the liner.

16. The isolating system as set forth in claim 15, wherein the compliant element is formed with an external tapered surface which allows the compliant element to enter an opening of the support and engage the liner for enhanced compression of the liner.

17. The isolating system as set forth in claim 14, wherein the liner is formed with a cylindrical section and an externally tapered section with the cylindrical section positionable within the passage of the support and about the butt joint of the two adjoined conduits.

18. The isolating system as set forth in claim 17, wherein the tapered section of the liner is captured between the coupling element and the support and is compressed to firmly compress the cylindrical section about the butt joint.

19. The isolating system as set forth in claim 18, which further comprises a hard washer located between the coupling element and the tapered section of the liner to enhance compression of the liner when the coupling element is coupled to the support.

* * * * *